(12) United States Patent
Hsieh et al.

(10) Patent No.: US 9,581,879 B2
(45) Date of Patent: Feb. 28, 2017

(54) LIGHT WAVELENGTH CONVERSION MODULE, ILLUMINATION SYSTEM, AND PROJECTION APPARATUS

(71) Applicants: Chi-Tang Hsieh, Hsin-Chu (TW); Chia-Hao Wang, Hsin-Chu (TW); Chi-Hsun Wang, Hsin-Chu (TW); Ko-Shun Chen, Hsin-Chu (TW)

(72) Inventors: Chi-Tang Hsieh, Hsin-Chu (TW); Chia-Hao Wang, Hsin-Chu (TW); Chi-Hsun Wang, Hsin-Chu (TW); Ko-Shun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 235 days.

(21) Appl. No.: 14/447,624

(22) Filed: Jul. 31, 2014

(65) Prior Publication Data
US 2015/0098070 A1   Apr. 9, 2015

(30) Foreign Application Priority Data
Oct. 7, 2013  (TW) .............................. 102136232 A (51) Int. Cl.
*G03B 21/20*  (2006.01)
*G02F 1/35*  (2006.01)
(Continued)

(52) U.S. Cl.
CPC ................ *G02F 1/353* (2013.01); *F21K 9/64* (2016.08); *F21V 9/16* (2013.01); *G03B 21/204* (2013.01);
(Continued)

(58) Field of Classification Search
CPC ........ G03B 21/28; G02B 17/08; G02B 13/16; G02B 17/00
See application file for complete search history.

(56) References Cited

U.S. PATENT DOCUMENTS

| 7,772,534 | B2 | 8/2010 | Ito |
| 2011/0090466 | A1 | 4/2011 | Chiang |

(Continued)

FOREIGN PATENT DOCUMENTS

| CN | 1945511 | 4/2007 |
| CN | 102103435 | 6/2011 |

(Continued)

OTHER PUBLICATIONS

WO2013071742 Translation.*
(Continued)

*Primary Examiner* — Sultan Chowdhury
*Assistant Examiner* — Danell L Owens
(74) *Attorney, Agent, or Firm* — Jianq Chyun IP Office (57) ABSTRACT

A light wavelength conversion module including a substrate, a first light wavelength conversion layer, and a first light transmissive layer is provided. The substrate has a light passing-through area and a first light wavelength conversion area. The first light wavelength conversion layer is located at the first light wavelength conversion area and between the first light transmissive layer and the substrate. The first light wavelength conversion layer is suitable for converting a coherent light beam into a first conversion light beam, wherein wavelengths of the coherent light beam and the first conversion light beam are different from each other. An illumination system and a projection apparatus are also provided.

30 Claims, 8 Drawing Sheets (51) Int. Cl.
*F21V 9/16* (2006.01)
*F21Y 101/00* (2016.01)

(52) U.S. Cl.
CPC ....... *F21Y 2101/00* (2013.01); *F21Y 2115/30* (2016.08)

(56) References Cited

U.S. PATENT DOCUMENTS

| | | | |
|---|---|---|---|
| 2012/0102126 A1 | 4/2012 | Murphy et al. | |
| 2013/0194644 A1* | 8/2013 | Cable | G03H 1/2205 359/9 |
| 2014/0253882 A1* | 9/2014 | King | G02B 26/008 353/31 |
| 2015/0002824 A1* | 1/2015 | Kasugai | G03B 21/204 353/31 |

FOREIGN PATENT DOCUMENTS

| | | | | |
|---|---|---|---|---|
| CN | 102272953 | 12/2011 | | |
| CN | 102272954 | 12/2011 | | |
| CN | 102298467 | 12/2011 | | |
| CN | 102426403 | 4/2012 | | |
| CN | 102540656 | 7/2012 | | |
| CN | 202708991 | 1/2013 | | |
| CN | 103105659 | 5/2013 | | |
| CN | 103116204 | 5/2013 | | |
| CN | WO 2013071742 A1 * | 5/2013 | ........... | G03B 21/204 |
| TW | 200722893 | 6/2007 | | |
| TW | 201214009 | 4/2012 | | |
| TW | 201239508 | 10/2012 | | |
| WO | 0147285 | 6/2001 | | |

OTHER PUBLICATIONS

"Office Action of Taiwan Counterpart Application", issued on Feb. 13, 2015, p. 1-p. 5.
"Office Action of China Counterpart Application", issued on Dec. 2, 2015, p. 1-p. 10.
"Office Action of China Counterpart Application", issued on Jul. 27, 2016, p. 1-p. 6.

* cited by examiner

LIGHT WAVELENGTH CONVERSION MODULE, ILLUMINATION SYSTEM, AND PROJECTION APPARATUS

CROSS-REFERENCE TO RELATED APPLICATION

This application claims the priority benefit of Taiwan application serial no. 102136232, filed on Oct. 7, 2013. The entirety of the above-mentioned patent application is hereby incorporated by reference herein and made a part of this specification.

BACKGROUND OF THE INVENTION

Field of the Invention

The invention relates to an optical module, an optical system, and a displaying apparatus, and particularly to a light wavelength conversion module, an illumination system, and a projection apparatus.

Description of Related Art

With advances in display technology, an ultra high pressure lamp (UHP lamp) which emits white light may be employed with a color wheel in a projection apparatus to produce red light, green light, and blue light sequentially, which allows colored display images to be provided by the projection apparatus. In addition, the projection apparatus with light emitting diodes (LEDs) which emit red light, green light, and blue light as a light source has been developed recently. However, luminous efficiencies of the LEDs are between 5% and 12%, which are far less than a luminous efficiency of a laser diode that is more than 25%. Therefore, in recent years, laser light source with a fluorescent wheel has been gradually developed as the light source of the projection apparatus.

However, the existing laser projection apparatuses generally have a problem of poor color rendering property. The main reason is that emission spectra of the fluorescent powders used in the laser projection apparatuses are mainly between 490 nm to 580 nm, and such fluorescent powders have poor performance over 600 nm. Therefore, the display images displayed by the laser projection apparatuses are insufficient in performance of red light. The color rendering property of the laser projection apparatuses are improved mainly through additionally disposing red light emitting diodes in the laser projection apparatuses currently on the market. However, such methods need additional light emitting diodes and other coupling elements, and thus increase the costs. Different illumination systems are disclosed respectively in R.O.C. Patent No. 201239508 and U.S. Publication No. 20120102126. A fluorescent powder-converting type of a light-emitting apparatus is disclosed in China Patent No. 102272953. A fluorescent powder layer, a forming method thereof, and equipment for forming the fluorescent powder layer are disclosed in China Patent No. 102272954.

SUMMARY OF THE INVENTION

The invention is directed to a light wavelength conversion module, which may enhance the chroma of the light beam emitted therefrom.

The invention is directed to an illumination system, which has a good color rendering/color reproduction property.

The invention is directed to a projection apparatus, wherein colors of the images displayed thereby are relatively vivid.

Other objectives and advantages of the invention will be further understood from the technological features disclosed by the embodiments of the invention.

In order to achieve one or some or all of these purposes or any other purposes, an embodiment of the invention provides a light wavelength conversion module including a substrate, a first light wavelength conversion layer, and a first light transmissive layer. The substrate includes a light passing-through area and a first light wavelength conversion area located at a side of the light passing-through area. The first light wavelength conversion layer is located at the first light wavelength conversion area and is suitable for converting a coherent light beam into a first conversion light beam, wherein wavelengths of the coherent light beam and the first conversion light beam are different from each other. The first light wavelength conversion layer is located between the first light transmissive layer and the substrate.

An embodiment of the invention further provides an illumination system including a light wavelength conversion module and a coherent light source. The coherent light source emits a coherent light beam. The light wavelength conversion module is disposed on a transmission path of the coherent light beam, and includes a substrate, a first light wavelength conversion layer, and a first light transmissive layer. The substrate having a light passing-through area and a first light wavelength conversion area is located at a side of the light passing-through area. The first light wavelength conversion layer is located at the first light wavelength conversion area, and located between the first light transmissive layer and the substrate. The light passing-through area and the first light wavelength conversion area alternately cut into the transmission path of the coherent light beam. The coherent light beam irradiates the light passing-through area, and passes through the light passing-through area. The coherent light beam irradiates the first light wavelength conversion area, and the first light wavelength conversion layer converts the coherent light beam into a first conversion light beam. Wavelengths of the coherent light beam and the first conversion light beam are different from each other.

An embodiment of the invention further provides a projection apparatus including an illumination system, a light valve, and a projection lens. The light valve is disposed on a transmission path of an illumination beam from the illumination system to convert the illumination beam into an image beam, wherein the illumination beam is from the coherent light beam and the first conversion light beam. The projection lens is disposed on a transmission path of the image beam. The illumination system includes a coherent light source and a light wavelength conversion module. The coherent light source is suitable for emitting a coherent light beam. The light wavelength conversion module is disposed on a transmission path of the coherent light beam, and includes a substrate, a first light wavelength conversion layer, and a first light transmissive layer. The substrate having a light passing-through area and a first light wavelength conversion area is located at a side of the light passing-through area. The first light wavelength conversion layer is located at the first light wavelength conversion area, and located between the first light transmissive layer and the substrate. The light passing-through area and the first light wavelength conversion area alternately cut into the transmission path of the coherent light beam. The coherent light beam irradiates the light passing-through area, and passes through the light passing-through area. When the coherent light beam irradiates the first light wavelength conversion area, the first light wavelength conversion layer converts the coherent light beam into a first conversion light beam. Wavelengths of the coherent light beam and the first conversion light beam are different from each other.

Based on the above, in the embodiments of the invention, the chroma of the light beam emitted from the light wavelength conversion module is enhanced through the stacked-layers design of the light wavelength conversion layers, so as to allow the illumination system applying the light wavelength conversion module to have good color rendering/color reproduction property, and allow colors of the image displayed by the projection apparatus applying the illumination system to be relatively vivid.

In order to make the aforementioned and other features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front,""back,", "left", "right,", etc., is used with reference to the orientation of the Figure(s) being described. As such, the directional terminology is used for purposes of illustration and is in no way for limiting the invention.

Figure 1A:
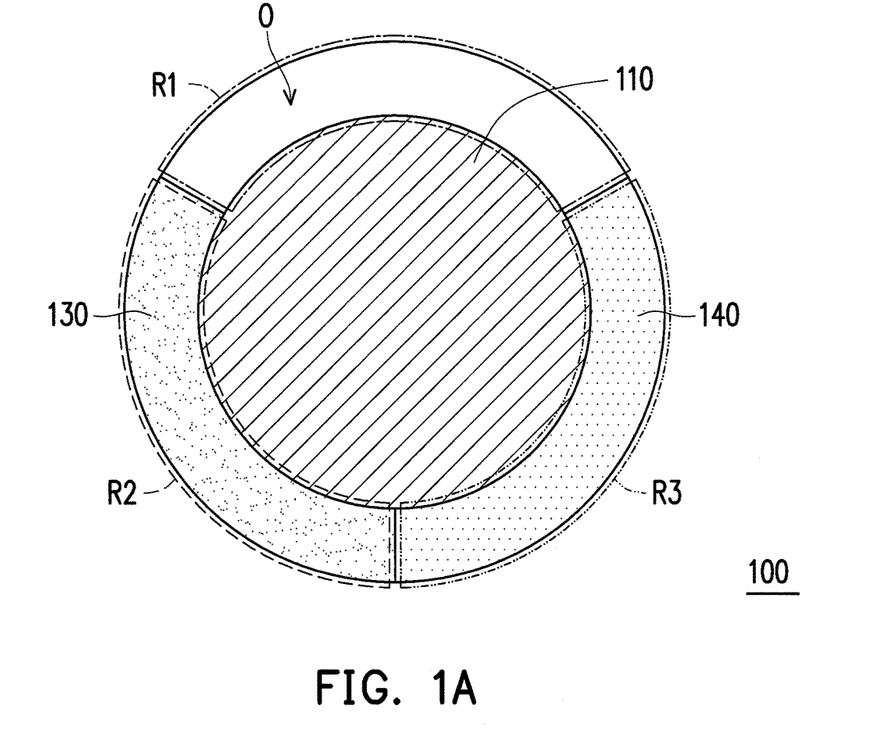
FIG. 1A illustrates a schematic diagram of a top view of a light wavelength conversion module according to the first embodiment of the invention.
Figure 1B:
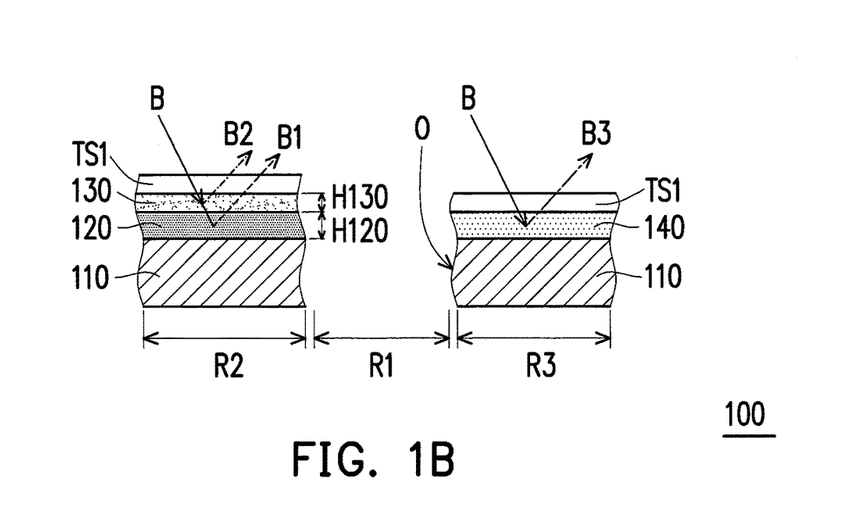
FIG. 1B illustrates a schematic cross-sectional view of the light wavelength conversion module in FIG. 1A.

Referring to FIG. 1A, the first light transmissive layer of the light wavelength conversion module is omitted in FIG. 1A. Referring to FIG. 1A and FIG. 1B, the light wavelength conversion module 100 of the embodiment includes a substrate 110, a first light wavelength conversion layer 120, a second light wavelength conversion layer 130, and a first light transmissive layer TS1.

The substrate 110 is suitable for carrying the first light wavelength conversion layer 120. The substrate 110 has a light passing-through area R1 and a first light wavelength conversion area R2 located next to the light passing-through area R1, wherein the light passing-through area R1 and the first light wavelength conversion area R2 are disposed around an edge of the substrate 110. The first light wavelength conversion layer 120 is located on the first light wavelength conversion area R2 and the first light transmissive layer TS1 is located on the first light wavelength conversion layer 120, so that the first light wavelength conversion layer 120 is tightly attached to the substrate 110. For instance, the material of the first light transmissive layer TS1 may be silicon, such as colloid having non-benzene structures with a refractive index of 1.4 or colloid having benzene structures with a refractive index of 1.5.

In the embodiment, for example, the first light wavelength conversion layer 120 is formed on the first light wavelength conversion area R2 by methods of deposition such as chemical vapor deposition (CVD), and the first light transmissive layer TS1 is formed on the first light wavelength conversion layer 120 by methods such as coating. Through the two-stage process steps, the contact between the first light wavelength conversion layer 120 and the substrate 110 may be enhanced and thermal resistance between the first light wavelength conversion layer 120 and the substrate 110 is reduced, so that heat dissipating efficiency of the first light wavelength conversion layer 120 may be enhanced.

To enhance the chroma of the light beam emitted from the light wavelength conversion module 100, the light wavelength conversion module 100 of the embodiment may further includes a second light wavelength conversion layer 130, wherein the first light wavelength conversion layer 120 and the second light wavelength conversion layer 130 are located on the first light wavelength conversion area R2 and at the same side of the substrate 110. The first light wavelength conversion layer 120 is disposed between the second light wavelength conversion layer 130 and the substrate 110. In addition, the first light wavelength conversion layer 120 and the second light wavelength conversion layer 130 overlap each other, wherein the first light wavelength conversion layer 120 and the second light wavelength conversion layer 130 are located between the first light transmissive layer TS1 and the substrate 110. In the embodiment, for example, the first light wavelength conversion layer 120 is located between the second light wavelength conversion layer 130 and the substrate 110, and the second light wavelength conversion layer 130 is located between the first light transmissive layer TS1 and the first light wavelength conversion layer 120, but the invention is not limited thereto. In another embodiment, locations of the first light wavelength conversion layer 120 and the second light wavelength conversion layer 130 may also be swapped, that is, the second light wavelength conversion layer 130 is located between the first light wavelength conversion layer 120 and the substrate 110, and the first light wavelength conversion layer 120 is located between the first light transmissive layer TS1 and the second light wavelength conversion layer 130.

Furthermore, in the light wavelength conversion module 100 of the embodiment, a single third light wavelength conversion layer 140 may be further disposed on the substrate 110, and the first light transmissive layer TS1 may be further disposed on the third light wavelength conversion layer 140. Specifically, in order to enhance the color diversity of the light beam emitted from the light wavelength conversion module 100, other light wavelength conversion layers may further be disposed in the light wavelength conversion module 100 of the embodiment. As shown in FIG. 1B, the light wavelength conversion module 100 may further include a third light wavelength conversion layer 140, and the substrate 110 may further have a second light wavelength conversion area R3, wherein the third light wavelength conversion layer 140 is located on the second light wavelength conversion area R3, and the first light transmissive layer TS1 is further located on the third light wavelength conversion layer 140.

The first light wavelength conversion layer 120 is suitable for converting the coherent light beam B into the first conversion light beam B1. The second light wavelength conversion layer 130 is suitable for converting the coherent light beam B into the second conversion light beam B2. The third light wavelength conversion layer 140 is suitable for converting the coherent light beam B into the third conversion light beam B3. Wavelengths of the coherent light beam B, the first conversion light beam B1, the second conversion light beam B2, and the third conversion light beam B3 are different from each other.

To be more specific, the coherent light beam B, the first conversion light beam B1, the second conversion light beam B2, and the third conversion light beam B3 are the light beams with different colors, respectively. The first light wavelength conversion layer 120, the second light wavelength conversion layer 130, and the third light wavelength conversion layer 140 are such as fluorescent powders which may excite the different colors, respectively. For example, the material of the first light wavelength conversion layer 120, the second light wavelength conversion layer 130, and the third light wavelength conversion layer 140 may be one of silicate fluorescent material, nitrogen oxides fluorescent material, yttrium aluminium garnet fluorescent material, nitrides fluorescent material, and sulfides fluorescent material, or any combination thereof.

The following illustration is an example of the coherent light beam with blue color. For instance, the first light wavelength conversion layer 120 is the yttrium aluminium garnet fluorescent material exciting the yellow light by absorbing the blue light spectrum, the second light wavelength conversion layer 130 is the nitrogen oxides fluorescent material exciting the red light by absorbing the blue light spectrum, and the third light wavelength conversion layer 140 is the yttrium aluminium garnet fluorescent material exciting the green light by absorbing the blue light spectrum. In other words, the colors of the coherent light beam B, the first conversion light beam B1, the second conversion light beam B2, and the third conversion light beam B3 of the embodiment are such as blue, yellow, red, and green, respectively. Furthermore, the emission spectrum of the first light wavelength conversion layer 120 (the spectrum of the first conversion light beam B1, that is, the yellow spectrum) partially overlaps the emission spectrum of the second light wavelength conversion layer 130 (the spectrum of the second conversion light beam B2, that is, the red spectrum).

Since the fluorescent powder of red light has relative high cost, if only the second light wavelength conversion layer 130 (for absorbing the spectrum of the blue light and emits the red light) is disposed in the first light wavelength conversion area R2, the cost of the light wavelength conversion module 100 is too high. On the other hand, if only the first light wavelength conversion layer 120 (for absorbing the spectrum of the blue light and emits the yellow light) is disposed in the first light wavelength conversion area R2, the light beam emitted from the first light wavelength conversion area R2 is insufficient in red color chroma. Furthermore, when the light wavelength conversion module applied to the illumination system is disposed together with a color wheel, since the color wheel is defined to be composed of filters and the first light wavelength conversion area R2 is, for example, disposed correspondingly to the red color filter, most of the yellow light is filtered out by the red color filter, so as to cause the problems of the illumination system with insufficient output power of red light and poor color rendering/color reproduction property, etc. Accordingly, real image colors are difficult to be provided by the projection apparatus applying the illumination system.

In the embodiment, the first light wavelength conversion area R2 employs a stacked-layers design of the first light wavelength conversion layer 120 and the second light wavelength conversion layer 130. When the coherent light beam B is irradiated to the first light wavelength conversion area R2, part of the coherent light beam B is absorbed by the second light wavelength conversion layer 130 for emitting the red light (the second conversion light beam B2), and part of the coherent light beam B passes through gaps of the second light wavelength conversion layer 130 to reach the first light wavelength conversion layer 120 to be absorbed by the first light wavelength conversion layer 120 for emitting the yellow light. Since the light beams emitted from the first light wavelength conversion area R2 include the yellow light emitted from the first light wavelength conversion layer 120 and the red light emitted from the second light wavelength conversion layer 130 and the red light is capable of compensating performances of the yellow light in the red color spectrum, the red color spectrum output from the light wavelength conversion module 100 in the embodiment may be enhanced.

Furthermore, in the embodiment, parameters such as thicknesses, concentrations, etc. of the first light wavelength conversion layer 120 and the second light wavelength conversion layer 130 may also be individually adjusted. Through the above adjustments, the red color spectrum output from the light wavelength conversion module 100 is effectively enhanced, and the illumination system applying the light wavelength conversion module 100 is maximized in the output power of red light. Accordingly, the color rendering/color reproduction property of the illumination system applying the light wavelength conversion module 100 is enhanced, and the projection apparatus applying the illumination system is capable of displaying relatively vivid image colors. For instance, a thickness H130 of the second light wavelength conversion layer 130 is less than a thickness H120 of the first light wavelength conversion layer 120, but the invention is not limited thereto. In another embodiment, the thickness H120 of the first light wavelength conversion layer 120 and the thickness H130 of the second light wavelength conversion layer 130 may also be determined depending on the design requirements. If the first light wavelength conversion layer 120 and the second light wavelength conversion layer 130 are formed by the above-mentioned deposition methods, the thicknesses of the fluorescent powder layers may be controlled through controlling doses of the fluorescent powders. For instance, in the above embodiment regarding the thickness H130 of the second light wavelength conversion layer 130 being less than the thickness H120 of the first light wavelength conversion layer 120, the doses of the fluorescent powders of the second light wavelength conversion layer 130 is such as in a range between 0.2 mg/cm$^2$ to 0.8 mg/cm$^2$, and the doses of the fluorescent powders of the first light wavelength conversion layer 120 is such as in a range between 8 mg/cm² to 15 mg/cm².

In practical applications, the substrate 110 may be a reflective substrate or a transparent substrate. As shown in FIG. 1A and FIG. 1B, when the substrate 110 employs the reflective substrate such as the substrate made of metals, alloys, or combinations thereof, the light passing-through area R1 may be formed by methods of hollowing the reflective substrate. For instance, the substrate 110 may include an opening O, and the opening O is located at the light passing-through area R1 to allow the light beam transmitted to the light passing-through area R1 to pass through. In another embodiment, light transmissive diffusion films may also be disposed in the opening O or the opening O may also be filled with other light transmissive substances, so as to reduce speckle noises of the systems applying the light wavelength conversion module 100.

Figure 1C:
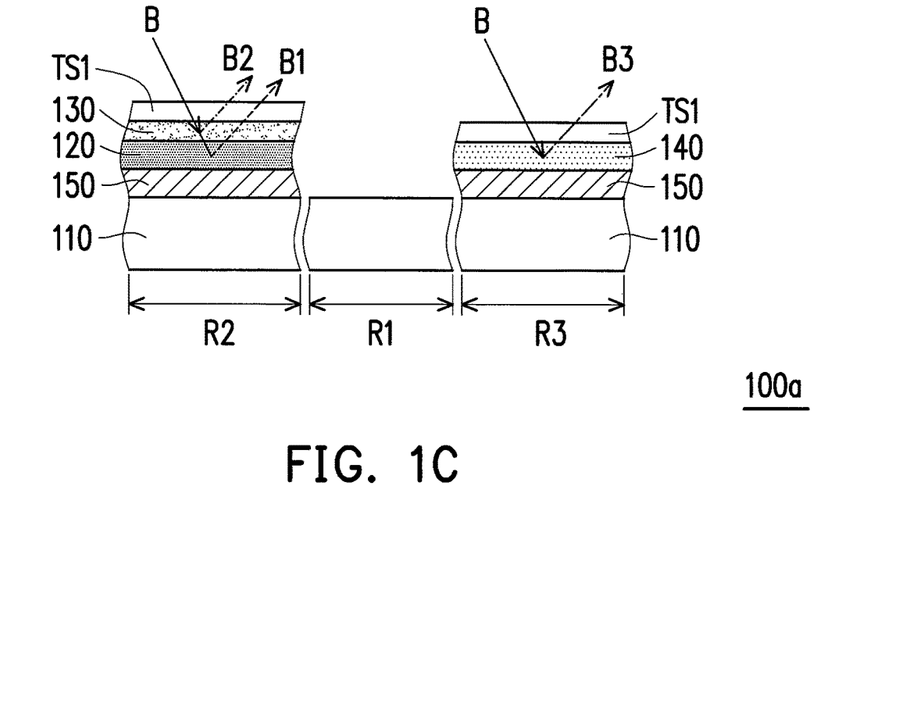
FIG. 1C to FIG. 1F illustrate schematic cross-sectional views of other forms of the light wavelength conversion modules according to the first embodiment of the invention.

Alternatively, as shown in FIG. 1C, the substrate 110 of the light wavelength conversion module 100a employs, for example, the transparent substrate, and an reflective element 150 may be further disposed on the first light wavelength conversion area R2 and the second light wavelength conversion area R3 in the light wavelength conversion module 100a; in addition, the reflective element 150 is located between the first light wavelength conversion layer 120 and the substrate 110, between the second light wavelength conversion layer 130 and the substrate 110, and between the third light wavelength conversion layer 140 and the substrate 110. Furthermore, in another embodiment, the reflective element 150 may be removed, so as to allow the first conversion light beam B1 and the second conversion light beam B2 to pass through the light transmissive substrate 110.

Figure 1D:
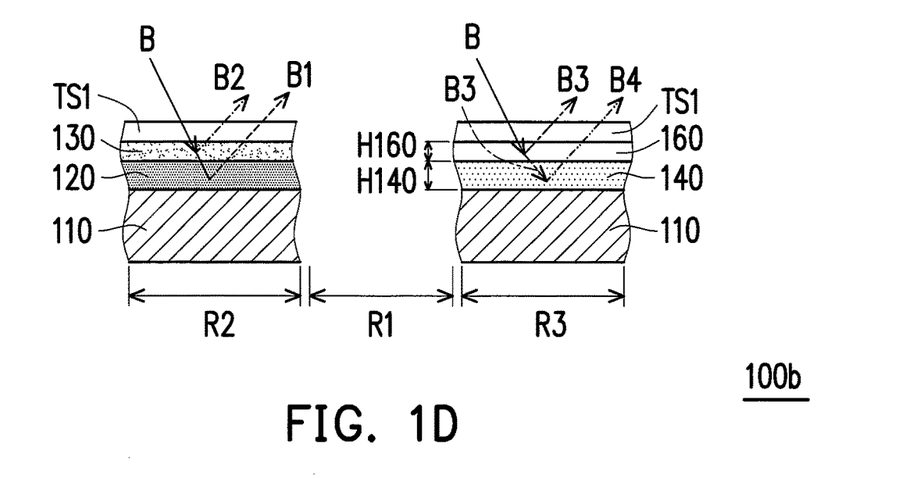

It should be noted that although enhancement in only red color saturation is illustrated in the above embodiments, but the invention is not limited thereto, and the design concept may also be applied to enhancement of the light intensity of the green color spectrum. As shown in FIG. 1D, the light wavelength conversion module 100b is substantially the same as the light wavelength conversion module 100 in FIG. 1B, wherein the same elements are represented by the same reference numerals, and thus are not reiterated herein. The differences between the light wavelength conversion module 100b and the light wavelength conversion module 100 are: the light wavelength conversion module 100b further includes a fourth light wavelength conversion layer 160, wherein the fourth light wavelength conversion layer 160 is located on the second light wavelength conversion area R3, and overlapped the third light wavelength conversion layer 140; the fourth light wavelength conversion layer 160 and the third light wavelength conversion layer 140 are located at the same side of the substrate 110, and the third light wavelength conversion layer 140 and the fourth light wavelength conversion layer 160 are located between the first light transmissive layer TS1 and the substrate 110. In the embodiment, for example, the third light wavelength conversion layer 140 is located between the fourth light wavelength conversion layer 160 and the substrate 110, and the fourth light wavelength conversion layer 160 is located between the first light transmissive layer TS1 and the third light wavelength conversion layer 140, but the invention is not limited thereto. In another embodiment, locations of the third light wavelength conversion layer 140 and the fourth light wavelength conversion layer 160 may also be swapped, that is, the fourth light wavelength conversion layer 160 is located between the third light wavelength conversion layer 140 and the substrate 110, and the third light wavelength conversion layer 140 is located between the first light transmissive layer TS1 and the fourth light wavelength conversion layer 160.

The fourth light wavelength conversion layer 160 is also such as the fluorescent layer, and for example, the excitation/excitation spectrum of the fourth light wavelength conversion layer 160 overlaps the excitation/emission spectrum of the third light wavelength conversion layer 140. In other words, the fourth light wavelength conversion layer 160 may absorb the third conversion light beam B3 emitted from the third light wavelength conversion layer 140 and convert the third conversion light beam B3 into a fourth conversion light beam B4, wherein the wavelengths of the coherent light beam B, the first conversion light beam B1, the second conversion light beam B2, the third conversion light beam B3, and the fourth conversion light beam B4 are different from each other.

To be more specific, for example, the fourth light wavelength conversion layer 160 is the silicate fluorescent powders exciting orange light by absorbing the green light with the wavelength at about 500 nm. In other words, the color of the fourth conversion light beam B4 is such as orange. When the coherent light beam B is irradiated to the second light wavelength conversion area R3, part of the coherent light beam B is absorbed by the third light wavelength conversion layer 140 to emit the third conversion light beam B3 (the green light), wherein part of the third conversion light beam B3 is transmitted to and is absorbed by the fourth light wavelength conversion layer 160 located under the third light wavelength conversion layer 140 to emit the orange light. In other words, the light beams emitted from the second light wavelength conversion area R3 include the green light emitted from the third light wavelength conversion layer 140 and the orange light emitted from the fourth light wavelength conversion layer 160. Since the orange light spectrum partially overlaps the green light spectrum, in the embodiment, the light intensity of the green color spectrum may be enhanced by using the orange light, so as to improve light utilization efficiencies and the output power of green light of the illumination system applying the light wavelength conversion module 100b.

Furthermore, in the embodiment, parameters such as thicknesses, concentrations, etc. of the third light wavelength conversion layer 140 and the fourth light wavelength conversion layer 160 may also be adjusted. Through the above adjustments, the green color spectrum output from the light wavelength conversion module 100b is effectively enhanced, the illumination system applying the light wavelength conversion module 100b maximize the output power of green light, the color rendering/color reproduction property of the illumination system applying the light wavelength conversion module 100b is enhanced, and the projection apparatus applying the illumination system is capable of displaying relatively vivid image colors. For instance, a thickness H160 of the fourth light wavelength conversion layer 160 is less than a thickness H140 of the third light wavelength conversion layer 140, but the invention is not limited thereto. In another embodiment, the thickness H140 of the third light wavelength conversion layer 140 and the thickness H160 of the fourth light wavelength conversion layer 160 may also be determined depending on the design requirements. Furthermore, although the substrate 110 of the embodiment is illustrated as the form in FIG. 1B, the substrate 110 of the light wavelength conversion module 100b may also be employed as the form in FIG. 1C.

Figure 1E:
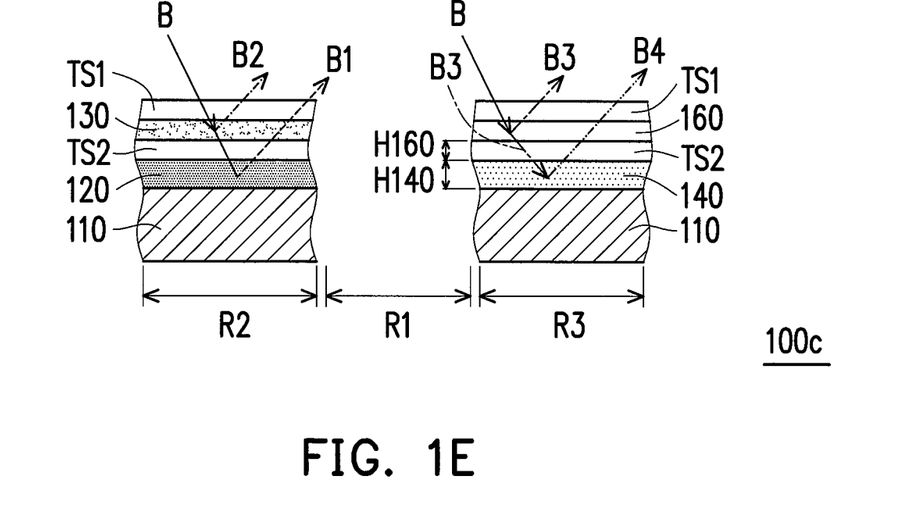

In addition, the light wavelength conversion module 100 may also further include another light transmissive layer located between light wavelength conversion layers. As shown in FIG. 1E, for example, the light wavelength conversion module 100c further includes a second light transmissive layer TS2, wherein the second light transmissive layer TS2 is located between the first light wavelength conversion layer 120 and the second light wavelength conversion layer 130, and between the third light wavelength conversion layer 140 and the fourth light wavelength conversion layer 160. That is, the first light wavelength conversion layer 120 is located between the second light transmissive layer TS2 and the substrate 110, and the third light wavelength conversion layer 140 is located between the second light transmissive layer TS2 and the substrate 110. In FIG. 1E, the second light transmissive layer TS2 is disposed under the framework of FIG. 1D, however, the second light transmissive layer TS2 may also further be disposed between the first light wavelength conversion layer 120 and the second light wavelength conversion layer 130 under the framework of FIG. 1B and FIG. 1C.

Figure 1F:
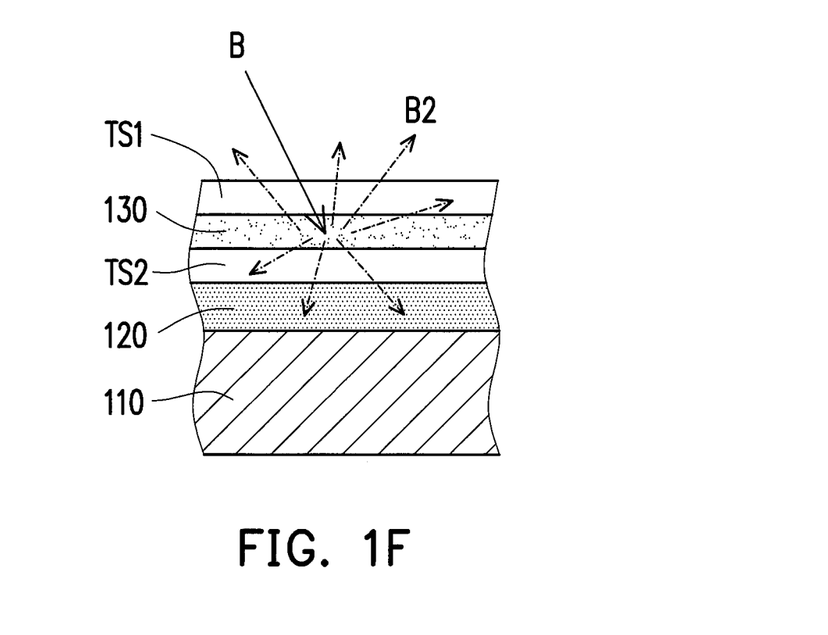

It should be noted that, although the first conversion light beam B1, the second conversion light beam B2, the third conversion light beam B3, the fourth conversion light beam B4, and the coherent light beam B irradiated to the first light wavelength conversion layer 120, the second light wavelength conversion layer 130, the third light wavelength conversion layer 140, and the fourth light wavelength conversion layer 160 are all shown as single light beam in FIG. 1B to FIG. 1E, however, actual excitation light beams are scattered in 360 degrees (as shown in FIG. 1F).

Figure 2A:
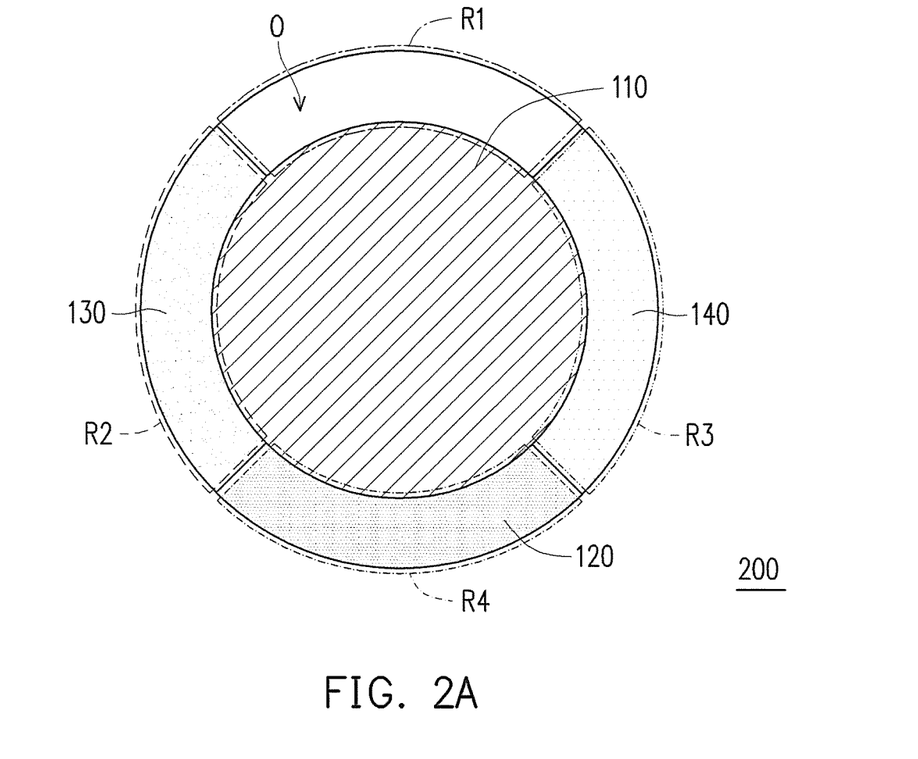
FIG. 2A illustrates a schematic diagram of a top view of a light wavelength conversion module according to the second embodiment of the invention.
Figure 2B:
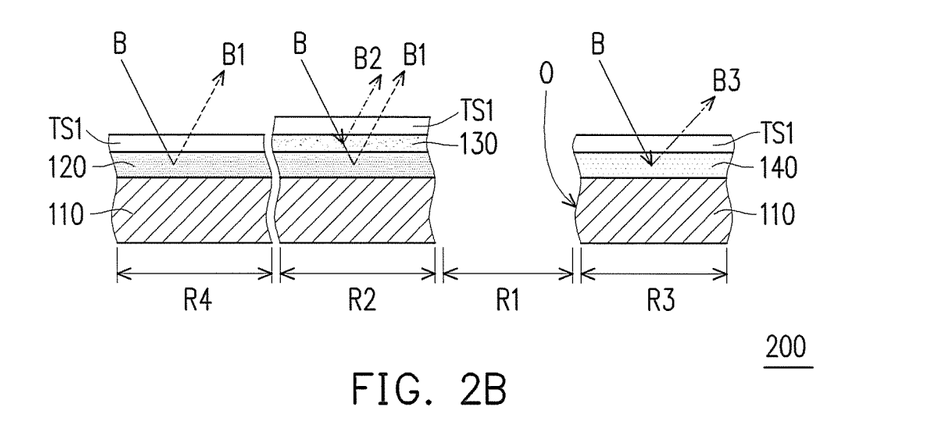
FIG. 2B illustrates a schematic cross-sectional view of the light wavelength conversion module in FIG. 2A.

Referring to FIG. 2A, the first light transmissive layer of the light wavelength conversion module is omitted in FIG. 2A. Referring to FIG. 2A and FIG. 2B, the light wavelength conversion module 200 of the embodiment is substantially the same as the light wavelength conversion module 100 in FIG. 1A and FIG. 1B, wherein the same elements are represented by the same reference numerals, and thus are not reiterated herein. The differences between the light wavelength conversion module 200 and the light wavelength conversion module 100 are: the light wavelength conversion module 200 further includes a third light wavelength conversion area R4, wherein the first light wavelength conversion layer 120 is further located at the third light wavelength conversion area R4, and the first light transmissive layer TS1 is further located on the first light wavelength conversion layer 120 at the third light wavelength conversion area R4. In other words, the light wavelength conversion module 200 of the embodiment has four areas, and the four areas output different colors respectively. Specifically, the blue light may be output if the blue light is irradiated to the light passing-through area R1, the red light may be output if the blue light is irradiated to the first light wavelength conversion area R2, the green light may be output if the blue light is irradiated to the second light wavelength conversion area R3, and the yellow light may be output if the blue light is irradiated to the third light wavelength conversion area R4.

Figure 2C:
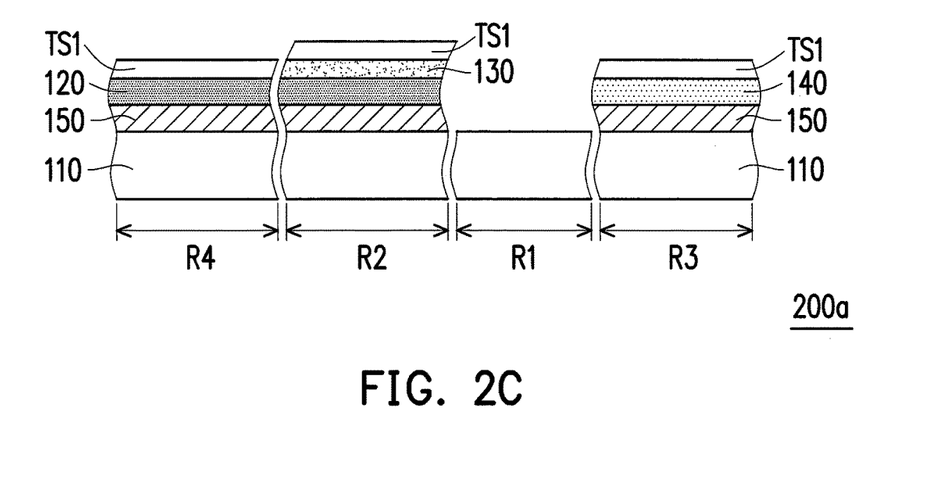
FIG. 2C illustrates a schematic cross-sectional view of another light wavelength conversion module according to the first embodiment of the invention.

Furthermore, as shown in FIG. 2C, the substrate 110 in the light wavelength conversion module 200a, the reflective substrate in FIG. 2B, may also be replaced with the transparent substrate. In addition, the reflective element 150 may be further disposed on the first light wavelength conversion area R2, the second light wavelength conversion area R3, and the third light wavelength conversion area R4 in the light wavelength conversion module 200a, and the reflective element 150 is located between the first light wavelength conversion layer 120 and the substrate 110, between the second light wavelength conversion layer 130 and the substrate 11, and between the third light wavelength conversion layer 140 and the substrate 110.

Furthermore, the fourth light wavelength conversion layer 160 in FIG. 1D may also be further disposed at the second light wavelength conversion area R3 under the frameworks of FIG. 2B and FIG. 2C to enhance the light intensity of the green color spectrum. As to details thereof, FIG. 1D, FIG. 1E, and the corresponding descriptions may be referred to, which are not reiterated herein.

Figure 3:
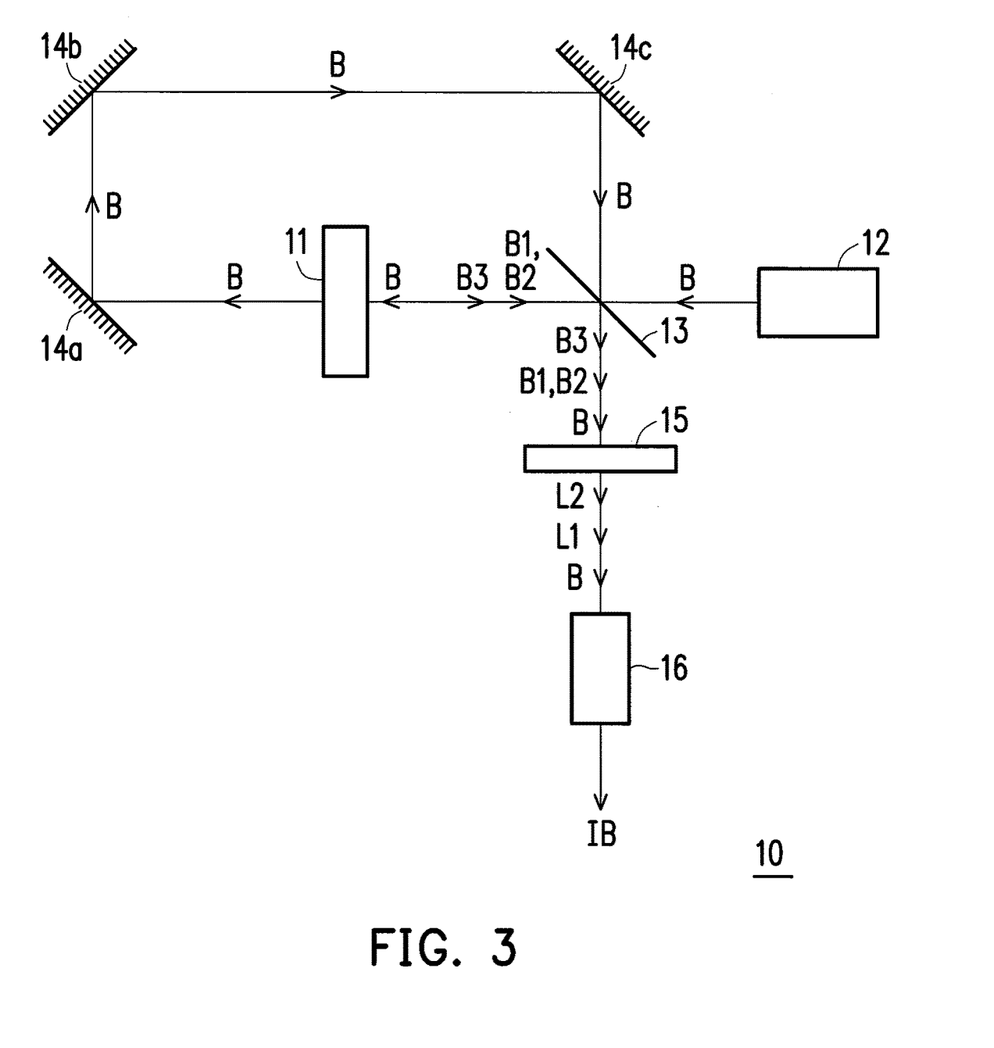
FIG. 3 illustrates a schematic diagram of an illumination system according to an embodiment of the invention.
Figure 4A:
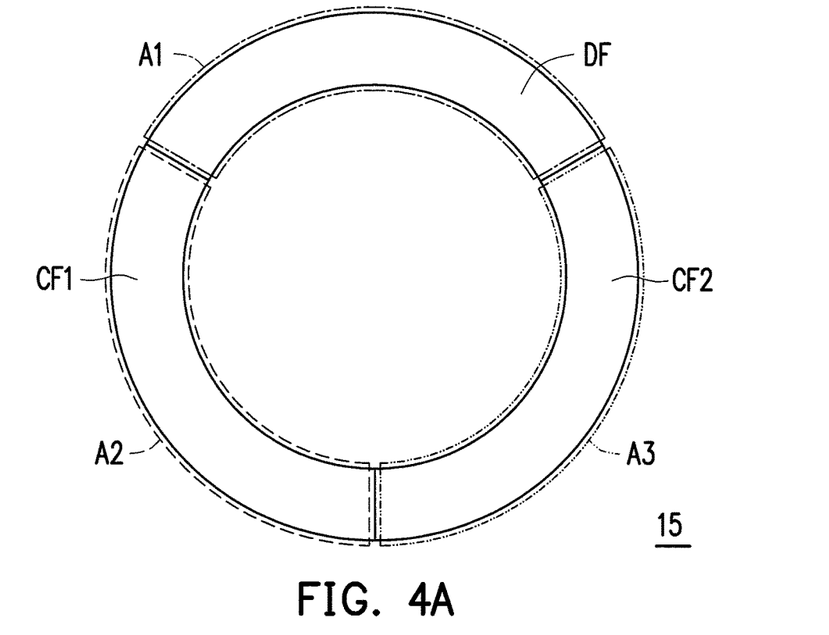
FIG. 4A and FIG. 4B illustrate schematic diagrams of a top views of two embodied forms of the color wheels in FIG. 3.

Referring to FIG. 3 and FIG. 4A, the illumination system 10 of the embodiment includes a light wavelength conversion module 11 and a coherent light source 12. For instance, the coherent light source 12 is a laser source suitable for providing the coherent light beam B. The coherent light beam B is such as a laser beam. The light wavelength conversion module 11 is disposed on the transmission path of the coherent light beam B. In the embodiment, for example, the light wavelength conversion module 100, 100a, 100b, 100c in FIG. 1B to FIG. 1E may be employed as the light wavelength conversion module 11.

Furthermore, the illumination system 10 of the embodiment may further include a beam combiner 13, reflecting mirrors 14a, 14b, 14c, a color wheel 15, and a light uniforming element 16. The beam combiner 13 is disposed on the transmission path of the coherent light beam B from the coherent light source 12, and the beam combiner 13 is located between the coherent light source 12 and the light wavelength conversion module 11. The beam combiner 13 combines the following light beams: the coherent light beam B passing through the light passing-through area R1 (referring to FIG. 1A and FIG. 1B) and the reflecting mirrors 14a, 14b, 14c, the first conversion light beam B1 and the second conversion light beam B2 from the first light wavelength conversion area R2, and the third conversion light beam B3 from the second light wavelength conversion area R3.

Specifically, after the coherent light beam B passes through the light passing-through area R1 of the light wavelength conversion module 11, the coherent light beam B is sequentially reflected by the reflecting mirror 14a, the reflecting mirror 14b, and the reflecting mirror 14c and transmitted to the beam combiner 13. The coherent light beam B further passes through the beam combiner 13 and is transmitted to the color wheel 15 thereafter. The first conversion light beam B1, the second conversion light beam B2, and the third conversion light beam B3 reflected to the beam combiner 13 by the reflective substrates of FIG. 1B or FIG. 1D or the reflective element 150 of FIG. 1C are reflected by the beam combiner 13, and are transmitted to the color wheel 15. Herein, the transmission path of the first conversion light beam B1, the second conversion light beam B2, and the third conversion light beam B3 substantially overlaps the transmission path of the coherent light beam B passing through the beam combiner 13.

The color wheel 15 is disposed on the transmission path of the coherent light beam B, the first conversion light beam B1, the second conversion light beam B2, and the third conversion light beam B3 from the beam combiner 13. Furthermore, the color wheel 15 is partitioned such as corresponding to the light wavelength conversion module 11. As shown in FIG. 4A, for example, the color wheel 15 of the embodiment includes a first light transmissive area A1, a first light filter area A2 located next to the first light transmissive area A1, and a second light filter area A3 located next to the first light transmissive area A1 and the first light filter area A2.

For instance, the first light transmissive area A1 is disposed with a diffusion film DF to reduce speckle noises of the illumination system 10. For instance, the first light filter area A2 is disposed with a first color light filter layer CF1, and the second light filter area A3 is disposed with a second color light filter layer CF2. Part of the spectrums of each conversion light beams may be filtered out by the disposition of the light filter layers, so that the color purity of an illumination beam IB emitted from the illumination system 10 is enhanced. In the embodiment, the first color light filter layer CF1 is such as a red color filter layer, and the second color light filter layer CF2 is such as a green color filter layer.

The first light transmissive area A1, the first light filter area A2, and the second light filter area A3 of the color wheel 15 cutting into to the transmission path of the light beams, for example, are corresponding to light passing-through area R1, the first light wavelength conversion area R2, and the second light wavelength conversion area R3 of the light wavelength conversion module 11 shown in FIG. 1A. Specifically, referring to FIG. 1A, FIG. 3, and FIG. 4A, the first light transmissive area A1 is corresponding to the light passing-through area R1 and cuts into the transmission path of the coherent light beam B passing through the light passing-through area R1, and the coherent light beam B passes through the diffusion film DF.

The first light filter area A2 is corresponding to the first light wavelength conversion area R2 and cuts into the transmission path of the first conversion light beam B1 and the second conversion light beam B2. The first conversion light beam B1 and the second conversion light beam B2 are converted into the first light beam L1 by the first color light filter layer CF1, wherein the spectrum of the first light beam L1 is narrower than the spectrum of the first conversion light beam B1. To be more specific, the spectrum of the first conversion light beam B1 is a yellow light spectrum covering part of the red light spectrum, and the spectrum of the second conversion light beam B2 is a red light spectrum. Therefore, the color purity of the illumination beam IB emitted from the illumination system 10 is enhanced by using the first color light filter layer CF1 to filter out light beyond the red light spectrum. On the other hand, since the stacked-layers design of the light wavelength conversion layers is employed in the first light wavelength conversion area R2 of the embodiment, light intensity of the light beam emitted from the light wavelength conversion module 11 may be enhanced in the red color spectrum. Accordingly, ratio of the light beam filtered out by the first color light filter layer CF1 may be relatively reduced, and thus the output power of the red light is enhanced.

The second light filter area A3 is corresponding to the second light wavelength conversion area R3 and cuts into the transmission path of the third conversion light beam B3, and the third conversion light beam B3 is converted into the second light beam L2 by the second color light filter layer CF2, wherein the spectrum of the second light beam L2 lies in the spectrum of the third conversion light beam B3. It should be noticed that, if the framework of FIG. 1D, in which the fourth light wavelength conversion layer 160 is further disposed at the second light wavelength conversion area R3, is employed in the light wavelength conversion module 11, then light intensity in the green color spectrum of the light emitted from the light wavelength conversion module 11 may be enhanced, and thus the output power of the green light is enhanced.

The light uniforming element 16 is disposed on the transmission path of the coherent light beam B, the first light beam L1, and the second light beam L2 from the color wheel 15. For example, the light uniforming element 16 is a light integration rod. The light integration rod may be composed of reflecting mirrors, and uniformity of the laser beam is enhanced such as by using multiple times of reflections.

Figure 4B:
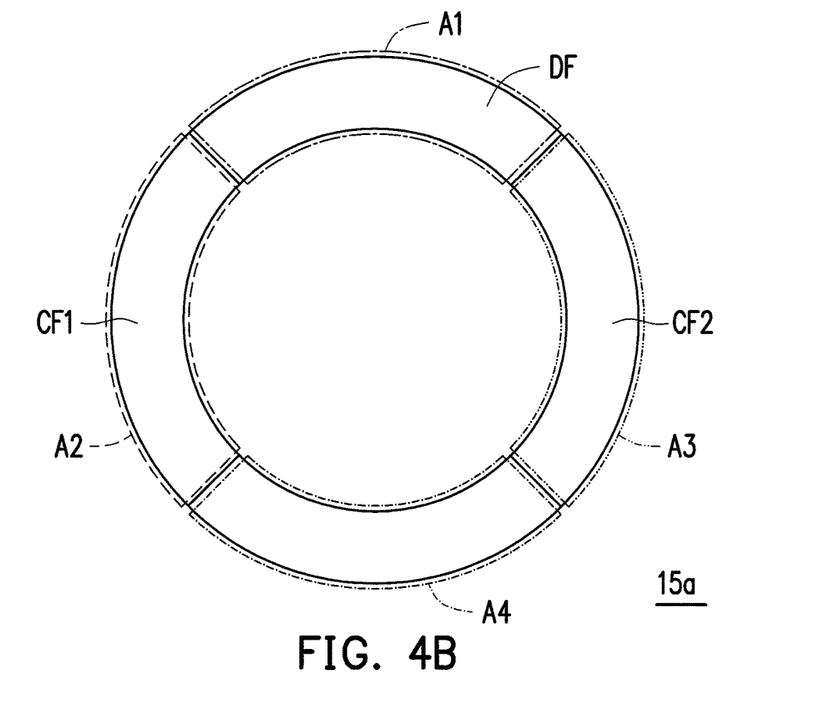

It should be noted that, the embodiments above are merely exemplified to illustrate the invention, and the invention is not limited thereto. In another embodiment, as shown in FIG. 4B, to enhance color diversity of the illumination beam IB emitted from the illumination system 10, the frameworks of FIG. 2A to FIG. 2C may also be employed in the light wavelength conversion module 11 of the embodiment. In addition, the color wheel 15a may further includes a second light transmissive area A4, wherein the second light transmissive area A4 is corresponding to the third light wavelength conversion area R4 and cuts into the transmission path of the first conversion light beam B1 from the third light wavelength conversion area R4 to allow the first conversion light beam B1 to pass through the second light transmissive area A4. Accordingly, the colors of the light beams emitted from the color wheel 15a include the blue color of the coherent light beam B, the red color of the first light beam L1, the green color of the second light beam L2, and the yellow color of the first conversion light beam B1.

Figure 5:
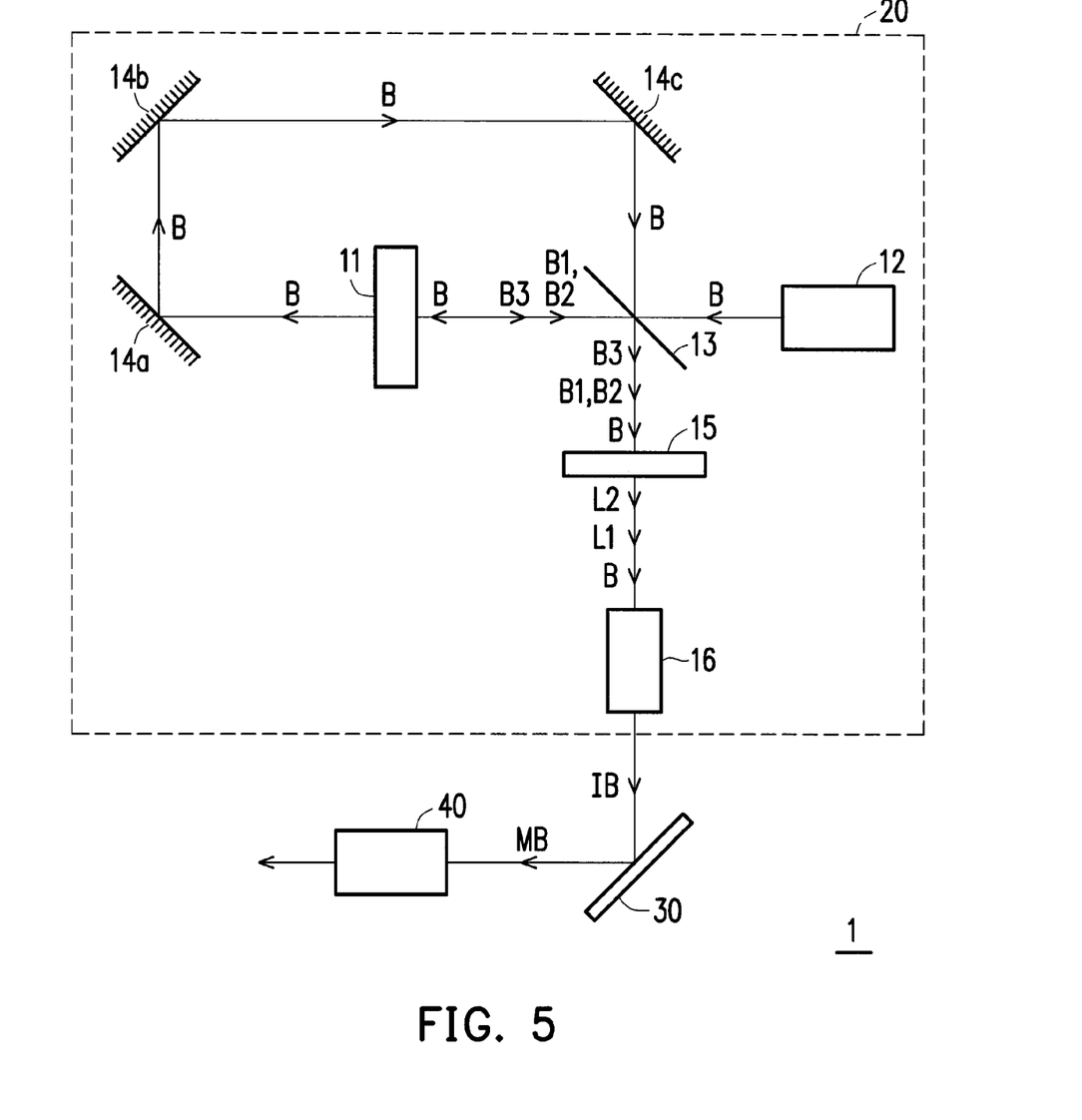
FIG. 5 illustrates a schematic diagram of a projection apparatus according to an embodiment of the invention.

Referring to FIG. 5, the projection apparatus 1 of the embodiment includes an illumination system 20, a light valve 30, and a projection lens 40. The illumination system 20, for example, employs the illumination system 10 in FIG. 3. The light valve 30 is disposed on the transmission path of the illumination beam IB from the illumination system 20 to convert the illumination beam IB into an image beam MB, wherein the illumination beam IB is from the above-mentioned coherent light beam B, the first conversion light beam B1, the second conversion light beam B2, and the third conversion light beam B3 (may be further from the fourth conversion light beam B4 under the framework of FIG. 1D). In the embodiment, the light valve 30 is, for example, a digital micro-mirror device (DMD). However, in another embodiment, the light valve 30 may also be a liquid-crystal-on-silicon panel (LCOS panel) or a transmissive liquid crystal panel.

The projection lens 40 is disposed on the transmission path of the image beam MB to project the image beam MB onto a screen or other objects capable of imaging. Under the framework of FIG. 4A, the image beam MB is such as a blue light beam, a red light beam, and a green light beam; under the framework of FIG. 4B, the image beam MB is such as a blue light beam, a red light beam, a green light beam, and a yellow light beam. When theses light beams are projected alternately with high frequency onto the screen, the users are able to see colored display images on the screen by the principle of persistence of vision.

Since the illumination system 20 in the projection apparatus 1 of the embodiment employs the illumination system 10 of FIG. 3, the stacked-layers design of the light wavelength conversion layer employed in the light wavelength conversion module 11 of the illumination system 10 may enhance the chroma of the light beam emitted from the light wavelength conversion module. Accordingly, the displaying images with relatively vivid colors may be projected by the projection apparatus 1 of the embodiment.

According to the above, in the invention, through the stacked-layers design of the light wavelength conversion layers, the chroma of the light beam emitted from the light wavelength conversion module may be enhanced. Thereby, the illumination system applying the light wavelength conversion module has the good color rendering/color reproduction property, and the colors of the images displayed by the projection apparatus applying the illumination system are relatively vivid. Furthermore, when a metal base is employed as the substrate, the fluorescent powders may be coated onto the substrate through disposition methods. By increasing the contact between the fluorescent powders and the metal base, the thermal resistance between the fluorescent powders and the substrate is reduced, so that the heat dissipating efficiency of the light wavelength conversion module is enhanced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Furthermore, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A light wavelength conversion module, comprising:
   a substrate, having a light passing-through area and a first light wavelength conversion area located at a side of the light passing-through area;
   a first light wavelength conversion layer, located at the first light wavelength conversion area, suitable for converting a coherent light beam into a first conversion light beam, wherein wavelengths of the coherent light beam and the first conversion light beam are different from each other; and
   a first light transmissive layer, wherein the first light wavelength conversion layer is located between the first light transmissive layer and the substrate, and the first light transmissive layer is capable of being passed through by the coherent light beam and the first conversion light beam.

2. The light wavelength conversion module as claimed in claim 1, further comprising:
   a second light wavelength conversion layer, located at the first light wavelength conversion area, overlapped the first light wavelength conversion layer, wherein the second light wavelength conversion layer and the first light wavelength conversion layer are located at the same side of the substrate, and the first light wavelength conversion layer and the second light wavelength conversion layer are located between the first light transmissive layer and the substrate, the second light wavelength conversion layer is suitable for converting the coherent light beam into a second conversion light beam, and wavelengths of the coherent light beam, the first conversion light beam, and the second conversion light beam are different from each other.

3. The light wavelength conversion module as claimed in claim 2, wherein the first light wavelength conversion layer is located between the second light wavelength conversion layer and the substrate.

4. The light wavelength conversion module as claimed in claim 2, further comprising:
   a second light transmissive layer, wherein the first light wavelength conversion layer is located between the second light transmissive layer and the substrate.

5. The light wavelength conversion module as claimed in claim 2, wherein a thickness of the second light wavelength conversion layer is less than a thickness of the first light wavelength conversion layer.

6. The light wavelength conversion module as claimed in claim 2, wherein an emission spectrum of the first light wavelength conversion layer partially overlaps an emission spectrum of the second light wavelength conversion layer.

7. The light wavelength conversion module as claimed in claim 2, wherein material of the first light wavelength conversion layer and the second light wavelength conversion layer is one of silicate fluorescent material, nitrogen oxides fluorescent material, yttrium aluminium garnet fluorescent material, nitrides fluorescent material, and sulfides fluorescent material, or any combination thereof.

8. The light wavelength conversion module as claimed in claim 2, wherein the substrate further comprises a second light wavelength conversion area, and the light wavelength conversion module further comprises a third light wavelength conversion layer, located at the second light wavelength conversion area, and the first light transmissive layer is further located on the third light wavelength conversion layer, wherein the third light wavelength conversion layer is suitable for converting the coherent light beam into a third conversion light beam, and wavelengths of the coherent light beam, the first conversion light beam, the second conversion light beam, and the third conversion light beam are different from each other.

9. The light wavelength conversion module as claimed in claim 8, further comprising:
   a fourth light wavelength conversion layer, located at the second light wavelength conversion area, overlapped the third light wavelength conversion layer, wherein the fourth light wavelength conversion layer and the third light wavelength conversion layer are located at the same side of the substrate, and the third light wavelength conversion layer and the fourth light wavelength conversion layer are located between the first light transmissive layer and the substrate.

10. The light wavelength conversion module as claimed in claim 9, wherein an emission spectrum of the fourth light wavelength conversion layer overlaps an emission spectrum of the third light wavelength conversion layer, the fourth light wavelength conversion layer is suitable for converting the third conversion light beam into a fourth conversion light beam, and wavelengths of the coherent light beam, the first conversion light beam, the second conversion light beam, the third conversion light beam, and the fourth conversion light beam are different from each other.

11. The light wavelength conversion module as claimed in claim 9, wherein the third light wavelength conversion layer is located between the fourth light wavelength conversion layer and the substrate, and the fourth light wavelength conversion layer is located between the first light transmissive layer and the third light wavelength conversion layer.

12. The light wavelength conversion module as claimed in claim 11, further comprising:
a second light transmissive layer, wherein the third light wavelength conversion layer is located between the second light transmissive layer and the substrate.

13. The light wavelength conversion module as claimed in claim 8, wherein the substrate further comprises a third light wavelength conversion area, and the first light wavelength conversion layer is further located at the third light wavelength conversion area.

14. An illumination system, comprising:
a coherent light source, suitable for emitting a coherent light beam; and
a light wavelength conversion module, disposed on a transmission path of the coherent light beam, and the light wavelength conversion module comprising:
a substrate, having a light passing-through area and a first light wavelength conversion area located at a side of the light passing-through area;
a first light wavelength conversion layer, located at the first light wavelength conversion area; and
a first light transmissive layer, wherein the first light wavelength conversion layer is located between the first light transmissive layer and the substrate, the light passing-through area and the first light wavelength conversion area alternately cut into the transmission path of the coherent light beam, the coherent light beam irradiates the light passing-through area, the coherent light beam passes through the light passing-through area, the coherent light beam irradiates the first light wavelength conversion area, and the first light wavelength conversion layer converts the coherent light beam into a first conversion light beam, wherein wavelengths of the coherent light beam and the first conversion light beam are different from each other, and the first light transmissive layer is capable of being passed through by the coherent light beam and the first conversion light beam.

15. The illumination system as claimed in claim 14, wherein the light wavelength conversion module further comprises a second light wavelength conversion layer, located at the first light wavelength conversion area, overlapped the first light wavelength conversion layer, wherein the second light wavelength conversion layer and the first light wavelength conversion layer are located at the same side of the substrate, and the first light wavelength conversion layer and the second light wavelength conversion layer are located between the first light transmissive layer and the substrate, when the coherent light beam irradiates the first light wavelength conversion area, the first light wavelength conversion layer converts the coherent light beam into the first conversion light beam, and the second light wavelength conversion layer converts the coherent light beam into a second conversion light beam, wavelengths of the coherent light beam, the first conversion light beam, and the second conversion light beam are different from each other.

16. The illumination system as claimed in claim 14, wherein the substrate is a reflective substrate, the substrate comprises an opening, and the opening is located at the light passing-through area.

17. The illumination system as claimed in claim 15, wherein the substrate is a transparent substrate, and the light wavelength conversion module further comprises a reflective element located at the first light wavelength conversion area, and the reflective element is located between the first light wavelength conversion layer and the substrate and between the second light wavelength conversion layer and the substrate.

18. The illumination system as claimed in claim 15, further comprising:
a beam combiner, disposed on the transmission path of the coherent light beam from the coherent light source, and located between the coherent light source and the light wavelength conversion module, wherein the beam combiner combines the coherent light beam passing through the light passing-through area and the first conversion light beam and the second conversion light beam from the first light wavelength conversion area.

19. The illumination system as claimed in claim 18, further comprising:
reflecting mirrors, wherein the coherent light beam passing through the light passing-through area is sequentially reflected by the reflecting mirrors and transmitted to the beam combiner.

20. The illumination system as claimed in claim 19, further comprising:
a color wheel, disposed on the transmission path of the coherent light beam, the first conversion light beam, and the second conversion light beam from the beam combiner, wherein the color wheel comprises a first light transmissive area and a first light filter area located at a side of the first light transmissive area, a diffusion film is disposed at the first light transmissive area, and a first color light filter layer is disposed at the first light filter area, wherein the first light transmissive area corresponds to the light passing-through area and cuts into the transmission path of the coherent light beam passing through the light passing-through area, the coherent light beam passes through the diffusion film, the first light filter area corresponds to the first light wavelength conversion area and cuts into the transmission path of the first conversion light beam and the second conversion light beam, and the first color light filter layer converts the first conversion light beam and the second conversion light beam into a first light beam.

21. The illumination system as claimed in claim 20, further comprising:
a light uniforming element, disposed on the transmission path of the coherent light beam and the first light beam from the color wheel.

22. The illumination system as claimed in claim 20, wherein the substrate further comprises a second light wavelength conversion area, and the light wavelength conversion module further comprises a third light wavelength conversion layer, located at the second light wavelength conversion area, and the first light transmissive layer is further located on the third light wavelength conversion layer, wherein the third light wavelength conversion layer is suitable for converting the coherent light beam into a third conversion light beam, wavelengths of the coherent light beam, the first conversion light beam, the second conversion light beam, and the third conversion light beam are different from each other, and wherein the color wheel further comprises a second light filter area located next to the first light filter area, a second color light filter layer is located at the second light filter area, the second light filter area corresponds to the second light wavelength conversion area and cuts into a transmission path of the third conversion light beam, and the second color light filter layer converts the third conversion light beam into a second light beam.

23. The illumination system as claimed in claim 22, wherein the substrate further comprises a third light wavelength conversion area, the first light wavelength conversion layer is further located at the third light wavelength conversion area, the first light transmissive layer is further located on the first light wavelength conversion layer at the third light wavelength conversion area, and the color wheel further comprises a second light transmissive area, wherein the second light transmissive area corresponds to the third light wavelength conversion area and cuts into the transmission path of the first conversion light beam from the third light wavelength conversion area, to allow the first conversion light beam to pass through the second light transmissive area.

24. A projection apparatus, comprising:
an illumination system, comprising:
a coherent light source, suitable for emitting a coherent light beam; and
a light wavelength conversion module, disposed on a transmission path of the coherent light beam, and the light wavelength conversion module comprising:
a substrate, having a light passing-through area and a first light wavelength conversion area located at a side of the light passing-through area;
a first light wavelength conversion layer, located at the first light wavelength conversion area; and
a first light transmissive layer, wherein the first light wavelength conversion layer s located between the first light transmissive layer and the substrate, the light passing-through area and the first light wavelength conversion area alternately cut into the transmission path of the coherent light beam, the coherent light beam irradiates the light passing-through area, the coherent light beam passes through the light passing-through area, when the coherent light beam irradiates the first light wavelength conversion area, the first light wavelength conversion layer converts the coherent light beam into a first conversion light beam, wherein wavelengths of the coherent light beam and the first conversion light beam are different from each other, and the first light transmissive layer is capable of being passed through by the coherent light beam and the first conversion light beam;
a light valve, disposed on a transmission path of an illumination beam from the illumination system, converting the illumination beam into an image beam, wherein the illumination beam is from the coherent light beam and the first conversion light beam; and
a projection lens, disposed on a transmission path of the image beam.

25. The projection apparatus as claimed in claim 24, wherein the light wavelength conversion module further comprises a second light wavelength conversion layer, located at the first light wavelength conversion area, overlapped the first light wavelength conversion layer, wherein the second light wavelength conversion layer and the first light wavelength conversion layer are located at the same side of the substrate, and the first light wavelength conversion layer and the second light wavelength conversion layer are located between the first light transmissive layer and the substrate, wherein when the coherent light beam irradiates the first light wavelength conversion area, the first light wavelength conversion layer converts the coherent light beam into the first conversion light beam, and the second light wavelength conversion layer converts the coherent light beam into a second conversion light beam, wavelengths of the coherent light beam, the first conversion light beam, and the second conversion light beam are different from each other, and the illumination beam is further from the second conversion light beam.

26. The projection apparatus as claimed in claim 25, wherein the illumination system further comprises a beam combiner, disposed on the transmission path of the coherent light beam from the coherent light source, and located between the coherent light source and the light wavelength conversion module, wherein the beam combiner combines the coherent light beam passing through the light passing-through area and the first conversion light beam and the second conversion light beam from the first light wavelength conversion area.

27. The projection apparatus as claimed in claim 26, wherein the illumination system further comprises a color wheel, disposed on the transmission path of the coherent light beam, the first conversion light beam, and the second conversion light beam from the beam combiner, wherein the color wheel comprises a first light transmissive area and a first light filter area located at a side of the first light transmissive area, a diffusion film is disposed at the first light transmissive area, and a first color light filter layer is disposed at the first light filter area, wherein the first light transmissive area corresponds to the light passing-through area and cuts into the transmission path of the coherent light beam passing through the light passing-through area, the coherent light beam passes through the diffusion film, the first light filter area corresponds to the first light wavelength conversion area and cuts into the transmission path of the first conversion light beam and the second conversion light beam, and the first color light filter layer converts the first conversion light beam and the second conversion light beam into a first light beam, wherein a spectrum of the first light beam is narrower than a spectrum of the first conversion light beam.

28. The projection apparatus as claimed in claim 27, further comprising:
a light uniforming element, disposed on the transmission path of the coherent light beam and the first light beam from the color wheel.

29. The projection apparatus as claimed in claim 27, wherein the substrate further comprises a second light wavelength conversion area, and the light wavelength conversion module further comprises a third light wavelength conversion layer, located at the second light wavelength conversion area, and the first light transmissive layer is further located on the third light wavelength conversion layer, wherein the third light wavelength conversion layer is suitable for converting the coherent light beam into a third conversion light beam, wavelengths of the coherent light beam, the first conversion light beam, the second conversion light beam, and the third conversion light beam are different from each other, and wherein the color wheel further comprises a second light filter area located at a side of the first light filter area, a second color light filter layer is located at the second light filter area, the second light filter area corresponds to the second light wavelength conversion area and cuts into a transmission path of the third conversion light beam, the second color light filter layer converts the third conversion light beam into a second light beam, and the illumination beam is further from the third conversion light beam.

30. The projection apparatus as claimed in claim 29, wherein the substrate further comprises a third light wavelength conversion area, the first light wavelength conversion layer is further located at the third light wavelength conversion area, the first light transmissive layer is further located on the first light wavelength conversion layer at the third light wavelength conversion area, and the color wheel further comprises a second light transmissive area, wherein the second light transmissive area corresponds to the third light wavelength conversion area and cuts into the transmission path of the first conversion light beam from the third light wavelength conversion area, to allow the first conversion light beam to pass through the second light transmissive area.

* * * * *